(12) United States Patent
Brandt et al.

(10) Patent No.: US 8,997,559 B2
(45) Date of Patent: Apr. 7, 2015

(54) METHOD AND DEVICE FOR DIAGNOSING A BLOWOFF VALVE FOR A SUPERCHARGING DEVICE OF AN INTERNAL COMBUSTION ENGINE

(71) Applicants: Martin Brandt, Sachsenheim (DE); Thomas Bleile, Stuttgart (DE); Patrick Menold, Stuttgart (DE); Andreas Huber, Grosskarolinenfeld (DE)

(72) Inventors: Martin Brandt, Sachsenheim (DE); Thomas Bleile, Stuttgart (DE); Patrick Menold, Stuttgart (DE); Andreas Huber, Grosskarolinenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 13/908,138

(22) Filed: Jun. 3, 2013

(65) Prior Publication Data

US 2013/0263653 A1 Oct. 10, 2013

(30) Foreign Application Priority Data

Jun. 4, 2012 (DE) .......................... 10 2012 209 357

(51) Int. Cl.
*G01M 15/04* (2006.01)
*F16K 37/00* (2006.01)

(52) U.S. Cl.
CPC ........... *G01M 15/04* (2013.01); *F16K 37/0075* (2013.01); *Y02T 10/144* (2013.01)

(58) Field of Classification Search
USPC ....................................... 73/114.77
See application file for complete search history.

(56) References Cited

U.S. PATENT DOCUMENTS

2002/0139180 A1* 10/2002 Xiong et al. ................. 73/118.1
2008/0236266 A1* 10/2008 Barton ........................ 73/114.37
2009/0114003 A1* 5/2009 Wegener et al. ........... 73/114.79

\* cited by examiner

*Primary Examiner* — Eric S McCall
(74) *Attorney, Agent, or Firm* — Kenyon & Kenyon LLP

(57) ABSTRACT

A method for diagnosing a blowoff valve in an engine system having a supercharged internal combustion engine, the blowoff valve being situated in a blowoff line around a compressor of a supercharging device, by performing the following: detecting a compressor rotational speed indication of the supercharging device; and determining a malfunction of the blowoff valve if the compressor rotational speed indication includes an oscillation after the blowoff valve is activated for opening the blowoff valve.

10 Claims, 3 Drawing Sheets

METHOD AND DEVICE FOR DIAGNOSING A BLOWOFF VALVE FOR A SUPERCHARGING DEVICE OF AN INTERNAL COMBUSTION ENGINE

RELATED APPLICATION INFORMATION

The present application claims priority to and the benefit of German patent application no. 10 2012 209 357.5, which was filed in Germany on Jun. 4, 2012, the disclosure of which is incorporated herein by reference.

FIELD OF THE INVENTION

The present invention relates to the field of supercharged internal combustion engines. The present invention furthermore relates to diagnostic methods for checking the function of a blowoff valve of a supercharging device.

BACKGROUND INFORMATION

Engine systems having internal combustion engines are frequently provided with supercharging devices such as exhaust gas-driven turbochargers for the purpose of supplying the internal combustion engine with fresh air under increased pressure. For this purpose, the supercharging devices include compressors which are connected via a shaft to a turbine, which is driven by an exhaust gas flow from the internal combustion engine.

In engine systems having supercharging devices, a so-called compressor stall at the compressor may occur in an air supply system if the load changes rapidly from a high load to a low load. The compressor stall produces an irritating noise and may cause damage to the impellers of the compressor. To avoid this, a blowoff line is usually provided with a blowoff valve which connects an output side of the compressor to its input side. The blowoff valve is closed during normal operation and opened only in operating states in which the compressor could otherwise enter an unstable operating state in which a compressor stall occurs.

To detect faults at an early stage, the blowoff valve may be regularly subjected to an on-board diagnosis in which its function is checked.

The diagnosis of the blowoff valve ordinarily takes place by evaluating the intake air mass flow or the boost pressure on the output side of the compressor. In both variables, the compressor stall is easily identified by a corresponding oscillation.

In modern engine systems, it is possible to dispense with the use of a mass air flow sensor on the input side of the air supply system, so that a diagnosis by evaluating the corresponding sensor signal is not possible. Moreover, engine systems are known which have two consecutively situated supercharging devices or two supercharging devices situated in parallel, so that a compressor stall in the individual compressors is no longer detectable by evaluating the boost pressure variable, since the pressure waves of the two compressors may, under some circumstances, overlay each other and thus temporarily extinguish each other.

SUMMARY OF THE INVENTION

According to the exemplary embodiments and/or exemplary methods of the present invention, a method for diagnosing a blowoff valve is provided according to the description herein, and a device, an engine system, a computer program and a computer program product are provided according to the other descriptions herein.

Further advantageous embodiments of the present invention are specified in the further description herein.

According to a first aspect, a method is provided for diagnosing a blowoff valve in an engine system having a supercharged internal combustion engine, the blowoff valve being situated in a blowoff line around a compressor of a supercharging device, including the following steps:

detecting a compressor rotational speed indication of the supercharging device;

determining a malfunction of the blowoff valve if the compressor rotational speed indication includes an oscillation after the blowoff valve is activated for opening the blowoff valve.

One idea of the above method is to evaluate a rotational speed of the compressor for the purpose of detecting a compressor stall, even if a boost pressure indication does not supply sufficient information about the state of the compressor. The evaluation of the rotational speeds of the compressor may furthermore permit a fault pattern to be assigned to a certain compressor in an engine system in which a multistage compression system is provided with the aid of multiple supercharging devices situated consecutively or in parallel. An assignment of a possible fault to a certain blowoff valve of one of the supercharging devices may not be carried out simply by evaluating a boost pressure indication.

It may furthermore be provided to determine that the compressor rotational speed indication includes an oscillation, in that the detected compressor rotational speed indication is high pass-filtered, a portion of the oscillations is ascertained within a predefined frequency range, and a threshold value comparison with the ascertained portion of the oscillations within the predefined frequency range is carried out.

According to one specific embodiment, the compressor rotational speed indication is ascertainable on a shaft of the supercharging device with the aid of a rotational speed sensor.

The above method may furthermore include the following additional steps:

detecting another compressor rotational speed indication of another supercharging device;

determining a malfunction of another blowoff valve of the additional supercharging device if the additional compressor rotational speed indication includes an oscillation after the additional blowoff valve is activated for opening the additional blowoff valve.

According to another aspect, a device, in particular an arithmetic unit, is provided for diagnosing a blowoff valve in an engine system having a supercharged internal combustion engine, the blowoff valve being situated in a blowoff line around a compressor of a supercharging device, the device being designed to:

detect a compressor rotational speed indication of the supercharging device;

determine a malfunction of the blowoff valve if the compressor rotational speed indication includes an oscillation after the blowoff valve is activated for opening the blowoff valve.

According to another aspect, an engine system is provided which includes an internal combustion engine and the above device.

According to another aspect, a computer program is provided which has a program code arrangement for carrying out all steps of the above method when the computer program is executed on an arithmetic unit or on the above device.

According to another aspect, a computer program product is provided which includes a program code which is stored on a machine-readable data carrier and which carries out the above method when it is executed on a data processing device.

Specific embodiments of the present invention are explained in greater detail below on the basis of the attached drawings.

DETAILED DESCRIPTION

Figure 1:
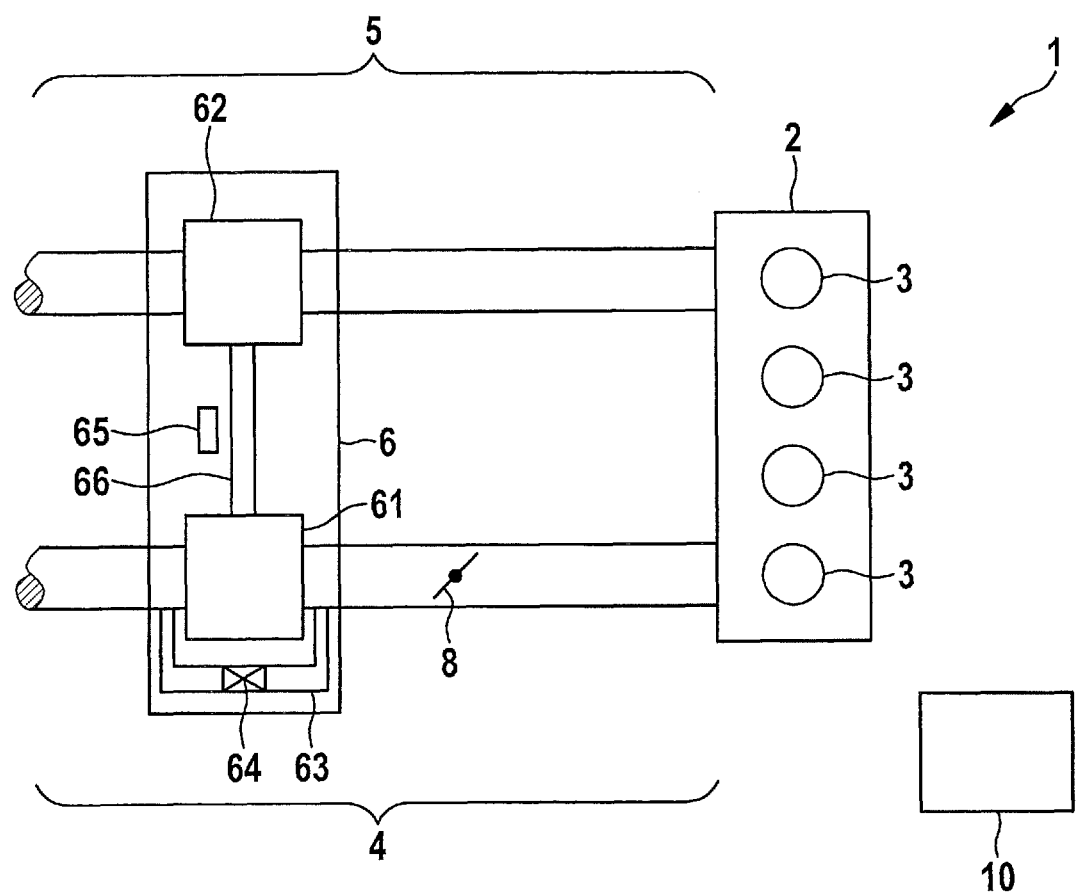
FIG. 1 shows a schematic representation of an engine system having a supercharging device.

FIG. 1 shows an engine system 1 which includes an internal combustion engine 2 and which may be designed, for example, as a gasoline engine or as a diesel engine. Internal combustion engine 2 includes cylinders 3 having a combustion chamber in which a movable piston is situated, so that four-stroke operation is possible.

Fresh air is suppliable to cylinders 3 via an air supply system 4. During operation of internal combustion engine 2, a fuel-air mixture is combusted in the combustion chambers, and the resulting combustion exhaust gas is ejected into an exhaust gas discharge section 5 and finally discharged into the surroundings.

Engine system 1 furthermore includes an exhaust gas-driven supercharging device 6, which includes a compressor 61 and which is situated in air supply system 4. Compressor 61 is designed to draw in fresh air from the surroundings of engine system 1 and to supply it to internal combustion engine 2 under an increased pressure, the boost pressure. Compressor 61 is mechanically coupled via a shaft 66 to a turbine 62, which is situated in exhaust gas discharge system 5. Turbine 62 is used to convert exhaust gas enthalpy from the exhaust gas flow ejected from internal combustion engine 2 into mechanical energy for the purpose of driving compressor 61 accordingly.

The efficiency of turbine 62, i.e., the portion of available exhaust gas enthalpy which is converted into mechanical power, is adjustable, for example by providing a variable turbine geometry, by providing a bypass line for guiding an adjustable portion of the exhaust gas flow around turbine 62 or with the aid of similar devices.

Supercharging device 6 furthermore has a rotational speed sensor 65 for the purpose of detecting the rotational speed of shaft 66 or of compressor 61 and for providing a corresponding compressor rotational speed indication. For example, rotational speed sensor 65 may be situated on compressor 61 for the purpose of detecting the rotational speed with the aid of moving compressor impellers of compressor 61.

A throttle valve 8, which may be used to adjust the amount of fresh air to be supplied to internal combustion engine 2, is furthermore situated in the section of air supply system 4 between compressor 61 and cylinders 3 of internal combustion engine 2.

A control unit 10 is furthermore provided which suitably operates engine system 1 for providing a certain rotational speed or load. For this purpose, control unit 10 detects operating states of internal combustion engine 2, for example its engine speed, the amount of fresh air supplied, and the like, engine system 1 being suitably operated by taking into account a predefined setpoint variable, for example a setpoint torque, by setting actuators, such as throttle valve 8, an actuator for setting the efficiency of turbine 62, fuel injectors on cylinders 3 and the like.

Internal combustion engines may be operated at different operating points. At a high load, a large amount of exhaust gas enthalpy is converted into mechanical energy, and a corresponding compressor power is provided thereby which provides a high boost pressure on the output side of compressor 61 when a high air mass flow is delivered. At a low load, for example when idling, only a small amount of exhaust gas enthalpy is available, so that the available compressor power is low.

During a load change from a high load to a low load, the amount of fresh air to be supplied to internal combustion engine 2 is rapidly reduced by closing throttle valve 8, so that the fresh air mass flow to be supplied by compressor 61 decreases rapidly, while the pressure difference existing over compressor 61 initially remains and is then only slowly decreased. At an operating point of this type, a so-called compressor stall may occur in compressors, in which a stall takes place at the compressor impellers. An operating situation of this type is undesirable, since it may result in acoustic disturbances and damage to the compressor impellers of compressor 61.

To avoid the compressor stall, a blowoff line 63 is provided which connects the output side to the input side of compressor 61. A blowoff valve 64 is provided in blowoff line 63 for the purpose of controlling the amount of fresh air conducted through blowoff line 63.

Control unit 10 monitors the operating states which are relevant for compressor 61 and, in particular, provides for opening blowoff valve 64 during a rapid load change from a high load to a low load, in particular a load change whose gradient exceeds a predefined slope, to prevent the air mass flow delivered by compressor 61 from dropping below a certain limiting value which depends on a pressure difference between the output side and the input side of compressor 61. By opening blowoff valve 64, the pressure difference between the output side and the input side of compressor 61 is reduced, and the delivery of a certain amount of air continues to be ensured, which is then partially fed back to the input side of compressor 61 via blowoff line 63.

Figure 2:
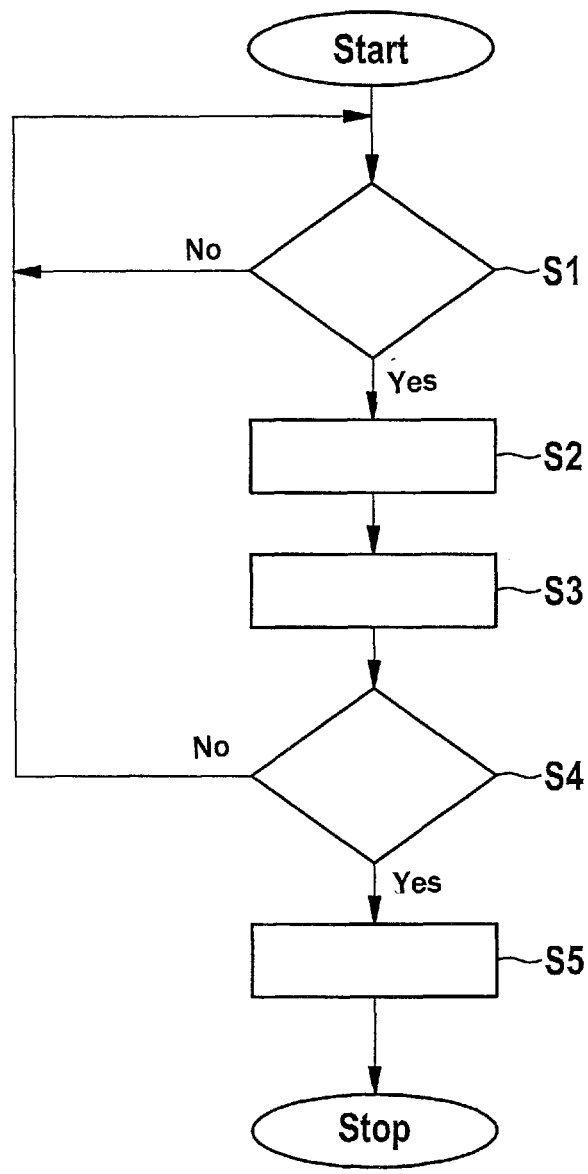
FIG. 2 shows a flow chart for illustrating a method for checking the function of blowoff valves in an engine system.

To ensure a proper operation of supercharging device 6, it is necessary to regularly check the components of the overall system. To check the function of blowoff valve 64, control unit 10 performs a diagnosis with the aid of the compressor rotational speed indication obtained via rotational speed sensor 65. For this purpose, control unit 10 carries out the following method for checking the function of blowoff valve 64 according to the flow chart in FIG. 2.

In a query step S1, a check is initially made of whether control unit 10 has activated blowoff valve 64 in such a way that the blowoff valve opens blowoff line 63. This is the case when an operating situation has occurred in which a compressor stall probably takes place. Operating situations in which a compressor stall may occur are usually ascertained by a predefined characteristic map, as a function of a pressure difference indication, for example a pressure ratio over compressor 61 and a (possibly temperature- and pressure-corrected) air mass flow through compressor 61.

Control unit 10 controls blowoff valve 64 in such a way that the latter is opened. The purpose of opening blowoff valve 64 is to increase the air mass flow through compressor 61 and/or to reduce the boost pressure on the output side of compressor 61, so that the air mass flow and the pressure difference indication over compressor 61 again define a stable operating point. This avoids an operating state which is defined by a pressure difference indication over compressor 61 and an air mass flow through compressor 61 and which is within a range of the predefined characteristic map in which a compressor stall or an unstable operation of compressor 61 is to be expected.

If blowoff valve 64 is not activated (alternative: no), the method returns to step S1. Otherwise (alternative: yes), it is ascertained, by monitoring the compressor rotational speed indication provided by compressor rotational speed sensor 65, whether a compressor stall has occurred despite the activation of blowoff valve 64 for opening the valve. For this purpose, in step S2, the compressor rotational speed indication provided by rotational speed sensor 65 is high pass-filtered or derived over time for obtaining only one high frequency portion of the compressor rotational speed indication.

In step S3, the resulting high pass-filtered compressor rotational speed indication is subjected to a Fourier analysis whose result is subjected to a threshold value comparison.

In step S4, a check is made of whether the high frequency portions of the compressor rotational speed indication, in particular certain high frequency portions, i.e., those within a predefined frequency range, exceed or do not exceed a predefined threshold value. If the high frequency portions of the compressor rotational speed indication do not exceed the threshold value (alternative: no), the method returns to step S1; otherwise (alternative: yes), a compressor stall is determined even though, as established in step S1, blowoff valve 64 has been activated for opening the valve. A faulty blowoff valve 64 may therefore be concluded, and this may be signaled accordingly in step S5.

Figure 3:
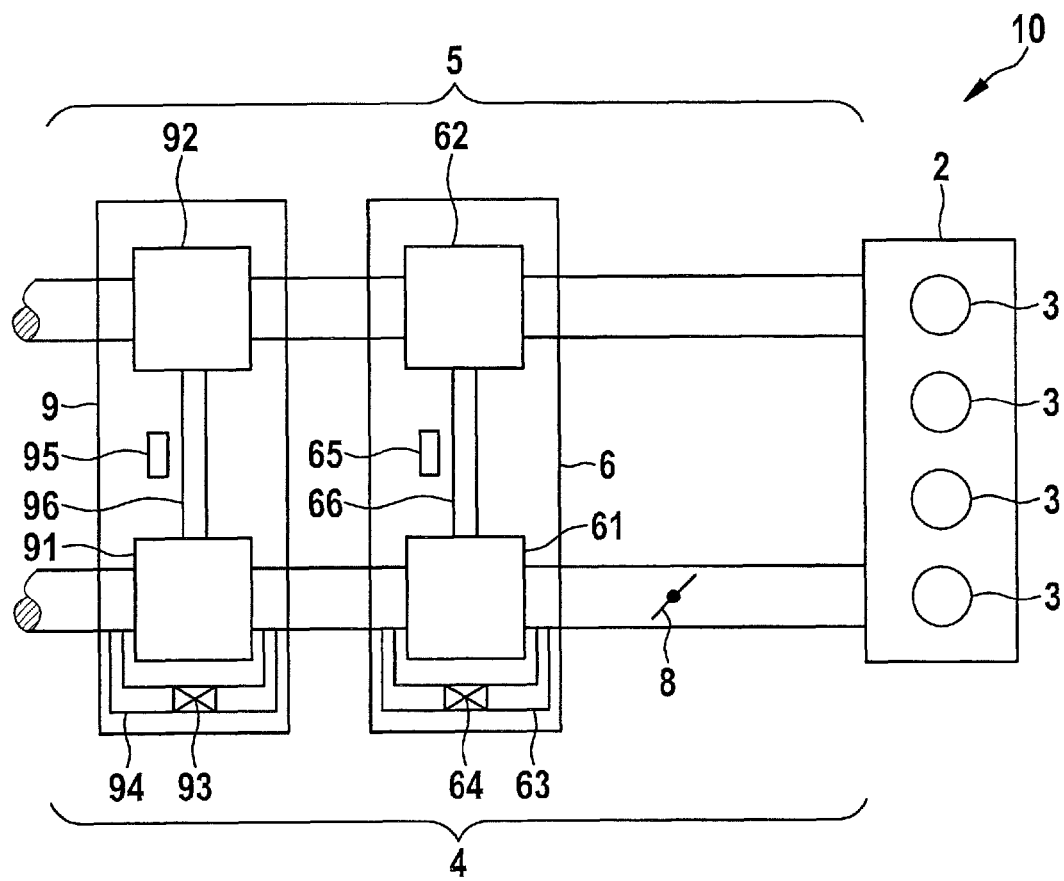
FIG. 3 shows a schematic representation of another engine system having a two-stage supercharging system.

The method described above may also be expanded to engine systems in which multi-stage supercharging takes place. For example, FIG. 3 shows an engine system 10, in which an additional supercharging stage is provided on the low pressure side in addition to engine system 1 in FIG. 1, in the form of another supercharging device 9. Additional supercharging device 9 includes another compressor 91, another turbine 92, another blowoff line 93, another blowoff valve 94, another rotational speed sensor 95 and another shaft 96.

Alternatively to the specific embodiment illustrated in FIG. 3, a twin-turbo configuration may also be provided, which includes two parallel-connected supercharging devices.

Blowoff valves 64, 94 of the two supercharging devices 6, 9 in both the serial configuration and the parallel configuration are activated accordingly by control unit 10. According to the method illustrated in FIG. 2, in the operating situation in which blowoff valves 64, 94 are opened to avoid a compressor stall, the high frequency portions of the compressor rotational speed indication of rotational speed sensor 65 and another compressor rotational speed indication of additional rotational speed sensor 95 are analyzed (high pass-filtered and subjected to a Fourier analysis for the purpose of determining their high frequency portions), and a corresponding assignment of a possibly occurring fault is made to blowoff valves 64, 94 assigned to particular compressor rotational speed sensors 65, 95.

What is claimed is:

1. A method for diagnosing a blowoff valve in an engine system, which has a supercharged internal combustion engine, having a supercharging device having a compressor, the method comprising:
   detecting a compressor rotational speed indication of the supercharging device; and
   determining a malfunction of the blowoff valve if the compressor rotational speed indication includes an oscillation after the blowoff valve is activated for opening the blowoff valve;
   wherein the blowoff valve is situated in a blowoff line around the compressor of the supercharging device.

2. The method of claim 1, wherein it is determined that the compressor rotational speed indication includes an oscillation in that the detected compressor rotational speed indication is high pass-filtered, a portion of the oscillations is ascertained within a predefined frequency range, and a threshold value comparison with the ascertained portion of the oscillations within the predefined frequency range is carried out.

3. The method of claim 1, wherein the compressor rotational speed indication is ascertained with the aid of a rotational speed sensor on a shaft or on the compressor of the supercharging device.

4. The method of claim 1, further comprising:
   detecting another compressor rotational speed indication of another supercharging device; and
   determining a malfunction of another blowoff valve of the additional supercharging device if the additional compressor rotational speed indication includes an oscillation after the additional blowoff valve is activated for opening the additional blowoff valve.

5. A device for diagnosing a blowoff valve in an engine system having a supercharged internal combustion engine, having a supercharging device having a compressor, comprising:
   a processing arrangement, including an arithmetic unit, configured to detect a compressor rotational speed indication of the supercharging device, and to determine a malfunction of the blowoff valve if the compressor rotational speed indication includes an oscillation after the blowoff valve is activated for opening the blowoff valve;
   wherein the blowoff valve is situated in a blowoff line around the compressor of the supercharging device.

6. An engine system having a supercharged internal combustion engine, having a supercharging device having a compressor, comprising:
   an internal combustion engine; and
   a device for diagnosing a blowoff valve in the engine, including:
      a processing arrangement, including an arithmetic unit, configured to detect a compressor rotational speed indication of the supercharging device, and to determine a malfunction of the blowoff valve if the compressor rotational speed indication includes an oscillation after the blowoff valve is activated for opening the blowoff valve;
      wherein the blowoff valve is situated in a blowoff line around the compressor of the supercharging device.

7. A computer readable medium having a computer program, which is executable by a processor, comprising:
   a program code arrangement having program code for diagnosing a blowoff valve in an engine system, which has a supercharged internal combustion engine, having a supercharging device having a compressor, by performing the following:
      detecting a compressor rotational speed indication of the supercharging device; and
      determining a malfunction of the blowoff valve if the compressor rotational speed indication includes an oscillation after the blowoff valve is activated for opening the blowoff valve;
      wherein the blowoff valve is situated in a blowoff line around the compressor of the supercharging device.

8. The computer readable medium of claim 7, wherein it is determined that the compressor rotational speed indication includes an oscillation in that the detected compressor rotational speed indication is high pass-filtered, a portion of the oscillations is ascertained within a predefined frequency range, and a threshold value comparison with the ascertained portion of the oscillations within the predefined frequency range is carried out.

9. The computer readable medium of claim 7, wherein the compressor rotational speed indication is ascertained with the aid of a rotational speed sensor on a shaft or on the compressor of the supercharging device.

10. The computer readable medium of claim 7, further comprising:
- detecting another compressor rotational speed indication of another supercharging device; and
- determining a malfunction of another blowoff valve of the additional supercharging device if the additional compressor rotational speed indication includes an oscillation after the additional blowoff valve is activated for opening the additional blowoff valve.

\* \* \* \* \*